US011129063B2

United States Patent
Zhang

(10) Patent No.: US 11,129,063 B2
(45) Date of Patent: Sep. 21, 2021

(54) METHOD, TERMINAL AND SYSTEM FOR UPDATING TRANSMISSION PATHS

(71) Applicant: YULONG COMPUTER TELECOMMUNICATION SCIENTIFIC (SHENZHEN) CO., LTD., Shenzhen (CN)

(72) Inventor: Chen-Lu Zhang, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 531 days.

(21) Appl. No.: 16/075,085

(22) PCT Filed: Aug. 29, 2016

(86) PCT No.: PCT/CN2016/097163
§ 371 (c)(1),
(2) Date: Aug. 2, 2018

(87) PCT Pub. No.: WO2017/133230
PCT Pub. Date: Aug. 10, 2017

(65) Prior Publication Data
US 2020/0169943 A1    May 28, 2020

(30) Foreign Application Priority Data

Feb. 3, 2016    (CN) .......................... 201610077448.2

(51) Int. Cl.
*H04W 36/00* (2009.01)
*H04W 76/11* (2018.01)
(Continued)

(52) U.S. Cl.
CPC ..... *H04W 36/0055* (2013.01); *H04W 40/248* (2013.01); *H04W 40/34* (2013.01); *H04W 76/11* (2018.02); *H04W 76/40* (2018.02)

(58) Field of Classification Search
CPC .......................... H04W 40/34; H04W 36/0055
See application file for complete search history.

(56) References Cited

U.S. PATENT DOCUMENTS 6,421,316 B1    7/2002    Masuo
6,574,663 B1 *  6/2003    Bakshi .................... H04L 41/12
                                                        709/220

(Continued)

FOREIGN PATENT DOCUMENTS

| CN | 101005456 A | 7/2007 |
|---|---|---|
| CN | 102594706 A | 7/2012 |
| CN | 105162705 A | 12/2015 |

*Primary Examiner* — James P Duffy
(74) *Attorney, Agent, or Firm* — ScienBiziP, P.C.

(57) ABSTRACT

Embodiments of the present disclosure disclose a method for updating transmission paths, which includes that: a terminal detects a link state of a communication link between the terminal and an adjacent network node; when the link state changes, the terminal determines at least one other terminal associated with the terminal; the terminal sends a first updating indication message including a link identity identifier and a link change identifier of the communication link, to the at least one other terminal, and the first updating indication message is used for indicating each of the at least one other terminal to update a corresponding transmission path set according to the link identity identifier and the link change identifier. The embodiments of the present disclosure also disclose a terminal and a system. By utilizing the present disclosure, available transmission paths of the terminal can be updated timely and accurately.

15 Claims, 10 Drawing Sheets

(51) Int. Cl.
*H04W 76/40* (2018.01)
*H04W 40/24* (2009.01)
*H04W 40/34* (2009.01)

(56) References Cited

U.S. PATENT DOCUMENTS

2003/0090996 A1* 5/2003 Stewart .................... H04L 45/02
370/225
2003/0165117 A1* 9/2003 Garcia-Luna-Aceves ...................
H04L 45/02
370/238
2015/0146603 A1* 5/2015 Wu ...................... H04L 61/2069
370/312

\* cited by examiner

METHOD, TERMINAL AND SYSTEM FOR UPDATING TRANSMISSION PATHS

CROSS-REFERENCE TO RELATED APPLICATIONS

This application claims priority of Chinese Patent Application No. 201610077448.2, entitled "method, terminal and system for updating transmission paths," filed on Feb. 3, 2016 in the SIPO (State Intellectual Property Office of the People's Republic of China), the entire contents of which are incorporated by reference herein.

FIELD

The embodiments of the present disclosure relates to a technical field of communication, specifically a method, a terminal and a system for updating transmission paths.

BACKGROUND

A mobility management method of an existing user equipment includes: during a process of data transmission between an user equipment and a serving base station, when the user equipment or the serving base station finds that a current Uu link does not satisfy a transmission requirement and determines that a base station switching needs to be performed, the user equipment or the serving base station triggers a cell switching process, the user equipment switches the current serving base station to a base station having a better Uu link quality. However, as a number of users increases and a density of deployed base stations increases, in order to optimize usage of frequency spectrum resources, a communication mode between equipments and a communication mode between base stations are appeared. When it is detected that a cell switching needs to be performed during the user equipment is moving, an available transmission path needs to be reselected for service transmission, how to ensure updating of the available transmission path of the user equipment is a current research problem.

SUMMARY

The technical problem to be solved by the embodiments of the present disclosure is to provide a method, a terminal and a system for updating transmission paths. An available transmission path of a terminal can be updated in time and accurately In order to solve the above technical problem, an embodiment of the present disclosure provides a method for updating transmission paths, which includes that: a terminal detects a link state of a communication link between the terminal and an adjacent network node; when the link state changes, the terminal determines at least one other terminal associated with the terminal; the terminal sends a first updating indication message including a link identity identifier and a link change identifier of the communication link, to the at least one other terminal, and the first updating indication message is used for indicating each of the at least one other terminal to update a corresponding transmission path set according to the link identity identifier and the link change identifier.

Correspondingly, an embodiment of the present disclosure further provides a method for updating transmission paths, which includes that: a terminal detects a link state of a communication link between the terminal and an adjacent network node; when the link state changes, the terminal sends an updating indication message including a link identity identifier and a link change identifier of the communication link, to a server; the server receives the updating indication message and acquires at least one other terminal associated with the terminal; the server updates a transmission path set corresponding to the terminal and a transmission path set corresponding to the at least one other terminal according to the link identity identifier and the link change identifier, and notifies the terminal and the at least one other terminal of the corresponding updated transmission path set respectively; or the server forwards the updating indication message to the at least one other terminal, and the updating indication message is used for indicating each of the at least one other terminal to update a corresponding transmission path set according to the link identity identifier and the link change identifier.

Correspondingly, an embodiment of the present disclosure further provides a method for updating transmission paths, which includes that: when a terminal triggers a service transmission, the terminal acquires at least one other terminal associated with the terminal; the terminal broadcasts a link state request message to the at least one other terminal, and the link state request message is used for indicating the at least one other terminal to detect a link state of a communication link between the at least one other terminal and an adjacent network node respectively, and to return a link state response message including a link state identifier and a link identity identifier of the communication link to the terminal; and the terminal receives the link state response message returned by the at least one other terminal respectively, and updates an associated transmission path set according to the link state identifier and the link identity identifier included in the link state response message.

BRIEF DESCRIPTION OF THE DRAWINGS

In order to describe the technical solutions in the embodiments of the present disclosure or the prior art more clearly, the following briefly introduces the accompanying drawings needed for describing the embodiments or the prior art, obviously, the accompanying drawings in the following description merely show some embodiments of the present disclosure, and persons of ordinary skill in the art may derive other drawings from these accompanying drawings without creative efforts.

FIG. 1b is a diagram of a specific example of the method for updating transmission paths in FIG. 1a;

FIG. 2b is a diagram of a specific example of the method for updating transmission paths in FIG. 2a;

DETAILED DESCRIPTION

With the accompanying drawings in the embodiments of the present disclosure described below, the technical solution in the embodiment of the present disclosure is clearly and completely described, apparently, the described embodiments are merely a part of the embodiments of the present disclosure rather than all embodiments. Based on the embodiments of the present disclosure, all other embodiments acquired by persons of ordinary skill in the art without creative efforts shall fall within the protection scope of the present disclosure.

Figure 1A:
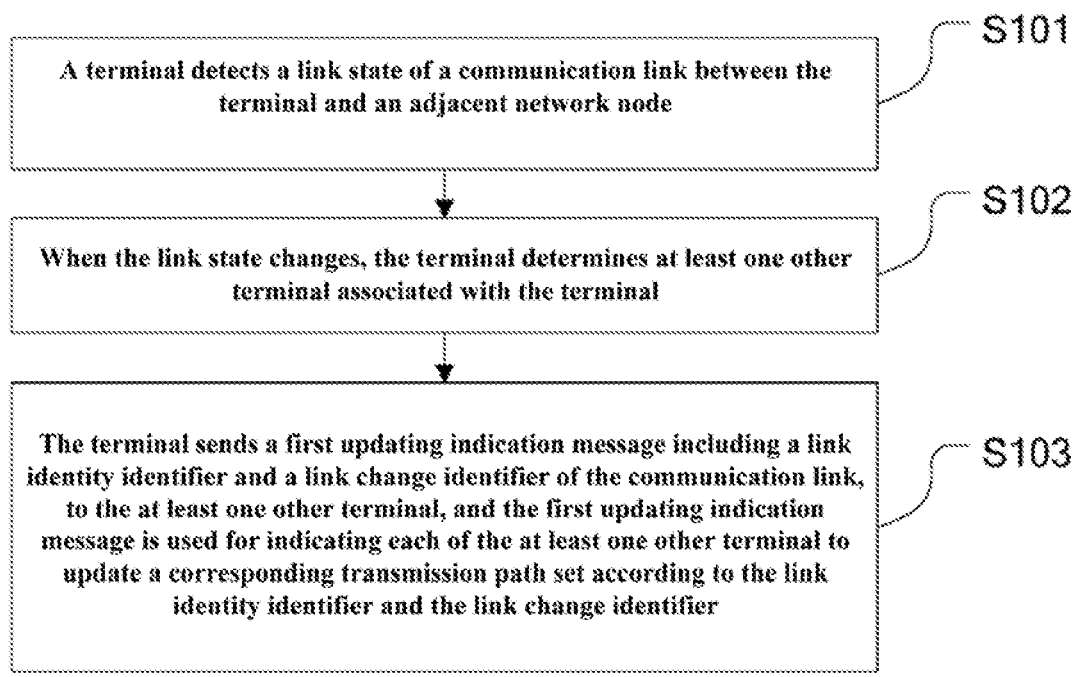
FIG. 1a is a flow diagram of a method for updating transmission paths provided by an embodiment of the present disclosure.

Referring to FIG. 1*a*, which is a flow diagram of a method for updating transmission paths provided by an embodiment of the present disclosure, in the embodiment of the present disclosure, the method includes:

S101: a terminal detects a link state of a communication link between the terminal and an adjacent network node.

Specifically, the adjacent network node represents a network node, a hop count between the adjacent network node and the terminal is 1, the terminal can be provided with one or more adjacent network nodes, a type of network nodes can be a terminal or a base station, and the communication link represents a channel for transmitting data between two network nodes. The link state of the communication link includes an available state and an unavailable state, the available state represents that link quality parameters of the communication link meet transmission requirements, and the unavailable state represents that the link quality parameters of the communication link do not meet the transmission requirements. When the link state of the communication link is the unavailable state, it is represented that the terminal is in a disconnected state in an extreme situation. In a general situation, the terminal is still in a connected state when the link state of the communication link is the unavailable state. The terminal determines all adjacent network nodes, the terminal can periodically detect link states of the communication links between the terminal and the adjacent network nodes, the method for determining the adjacent network nodes by the terminal can be that: the terminal acquires a pre-stored transmission path set associated with the terminal, and determines the adjacent network nodes according to a topological connection relation of each transmission path in the transmission path set. The transmission path set represents a set of all available transmission paths of a certain terminal, the transmission path includes at least one communication link.

S102: when the link state changes, the terminal determines at least one other terminal associated with the terminal.

Specifically, when the link state of the communication link is changed from the available state to the unavailable state, or is changed from the unavailable state to the available state, the terminal determines the associated at least one other terminal, a determination method can determine according to a pre-stored transmission path set as well.

S103, the terminal sends a first updating indication message including a link identity identifier and a link change identifier of the communication link, to the at least one other terminal, and the first updating indication message is used for indicating each of the at least one other terminal to update a corresponding transmission path set according to the link identity identifier and the link change identifier.

Specifically, the link identity identifier is used for uniquely representing an identity of the communication link, the link identity identifier of the communication link can be represented by using node identifiers of two network nodes corresponding to the communication link. For example, the two network nodes of the communication link are a terminal 2 and a base station 3, and the link identity identifier of the communication link between the terminal 2 and the base station 3 can be represented by the identifiers of the terminal 2 and the base station 3; the link change identifier represents a change tendency of the link state of the communication link, it indicates whether the link state is changed from the available state to the unavailable state or from the unavailable state to the available state; and the terminal broadcasts the first updating indication message including the link identity identifier and the link change identifier of the communication link, to the associated at least one other terminal; and each of the at least one other terminal updates a corresponding transmission path set according to its link identity identifier. For any other terminal among the at least one other terminal, the method for updating the transmission path set can be as follows: one other terminal acquires a current transmission path set; when the link change identifier is determined to be changed from the available state to the unavailable state, inquires for a transmission path that the communication link identifier is located, from the current transmission path set, and deletes the inquired transmission path; or when the link change identifier is determined to be changed from the unavailable state to the available state, acquires a newly-added transmission path according to a topological connection relation of each transmission path in the current transmission path set, and adds the newly-added transmission path into the current transmission path set.

It should be noted that the terminal also needs to update the current transmission path set according to the communication link identifier and the link change identifier, an updating method can refer to the updating method of other terminals, and it is not repeated herein. In addition, when the terminal broadcasts the first updating indication message to the at least one other terminal, if a communication link between the terminal and one of the at least one other terminal is unavailable, the terminal can indicate the other terminal among the at least one other terminal, to forward the first updating indication message to the one of the at least one other terminal, the other terminal has an available communication link with the one of the at least one other terminal.

Optionally, the terminal determines the at least one other terminal associated with the terminal, includes:

Acquiring a transmission path set associated with the terminal;

Determining the at least one other terminal according to the topological connection relation of the transmission path set associated with the terminal.

Specifically, the terminal acquires a pre-stored transmission path set, the transmission path set includes at least one available transmission path, and each transmission path at least includes a communication link. The terminal determines at least one other terminal associated with the terminal according to each communication link and the network node(s) corresponding to the available transmission path; or, a plurality of terminals form a self-organizing network, each terminal in the self-organizing network can be a Device-to-Device (D2D) terminal or a Terminal Services Client (TSC) terminal. A server maintains the topological connection relation of the self-organizing network, and when a terminal is deleted from the self-organizing network or newly-added, the server updates the topological connection relation of the self-organizing network in real time. The terminal can acquire the topological connection relation of the latest self-organizing network from the server, and acquire the at least one other terminal associated according to the topological connection relation.

Optionally, the method further includes:

The terminal receives a second updating indication message including a link identity identifier and a link change identifier sent by any one of the at least one other terminal;

The terminal updates the associated transmission path set according to the link identity identifier and the link change identifier included in the second updating indication message.

Specifically, when any one of the at least one other terminal detects a link state of a communication link with an adjacent network node changes, the any one of the at least one other terminal associated with the terminal sends the second updating indication message including the link identity identifier and the link change identifier to the terminal. Except sending the second updating indication message to the terminal, the updating indication message also sends the second updating indication message to other associated terminals. The terminal updates the associated transmission path set according to the link identity identifier and the link change identifier included in the second updating indication message.

Optionally, the terminal updates the associated transmission path set according to the link identity identifier and the link change identifier included in the second updating indication message, includes:

The terminal parses the link identity identifier and the link change identifier included in the second updating indication message;

When the link change identifier indicates that it is changed from the available state the unavailable state, the terminal inquires for a transmission path matched with the link identity identifier in the transmission path set associated with the terminal, and deletes the matched transmission path from the transmission path set associated with the terminal;

When the link change identifier indicates that it is changed from the unavailable state to the available state, the terminal acquires a topological connection relation of each transmission path included in the transmission path set associated with the terminal, determines a newly-added transmission path according to the link identity identifier and the topological connection relation, and adds the newly-added transmission path into the transmission path set associated with the terminal.

Specifically, it is indicated that a link quality parameter of the communication link does not meet a requirement when the communication link is in the unavailable state, for example, the terminal periodically collects link quality parameter of the communication link. When the link quality parameter of the communication link is greater than a preset value, the communication link is determined to be in the available state; and when the link quality parameter of the communication link is smaller than the preset value, the communication link is determined to be in the unavailable state. Or, the terminal periodically collects a plurality of link quality parameters, and when the plurality of link quality parameters are all greater than a first preset value, the communication link is determined to be in the available state, and when the plurality of link quality parameters are all smaller than a second preset value, the communication link is determined to be in the unavailable state. When the plurality of link quality parameters are distributed between the first preset value and the second preset value, or the plurality of link quality parameters include the first preset value or the second preset value, a rate of change of the plurality of link quality parameters is further determined. When the rate of change is a positive value, the communication link is determined to be in the available state, and when the rate of change is a negative value, the communication link is determined to be in the unavailable state. The terminal parses the link identity identifier and the link change identifier included in the second updating indication message. Under the condition that the link change identifier indicates that the communication link is changed from the available state to the unavailable state, the terminal inquires for the transmission path matched with the link identity identifier in the associated transmission path set, and deletes the matched transmission path from the associated transmission path set.

Figure 1B:
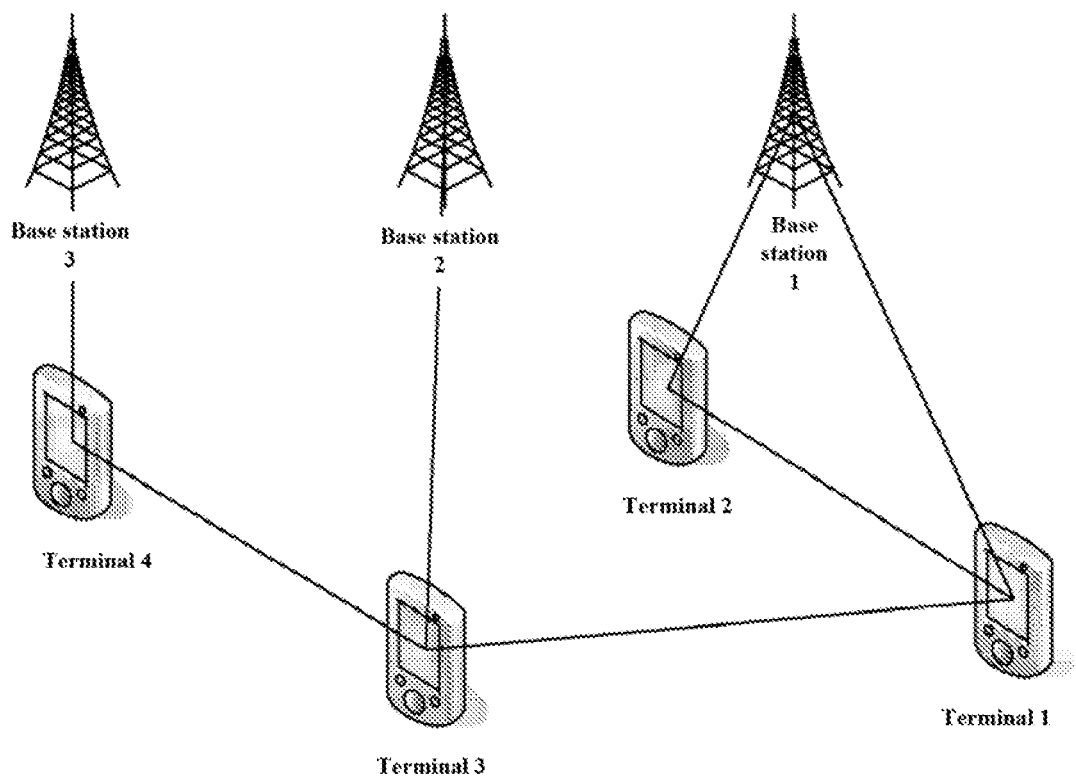

For example, referring to FIG. 1b, a communication system includes four terminals and three base stations, the terminal is assumed to be a terminal 1, and the other terminals associated with the terminal 1 are a terminal 2, a terminal 3 and a terminal 4, and two network nodes of the communication link corresponding to the link identity identifier of the terminal 1 are a terminal 4 and a base station, a transmission path set associated with the terminal 1 includes four transmission paths, which are a transmission path 1: the terminal 1—a base station 1, a transmission path 2: the terminal 1—the terminal 2—the base station 1, a transmission path 3: the terminal 1—the terminal 3—a base station 2, and a transmission path 4: the terminal 1—the terminal 3—the terminal 4—a base station 3. The terminal 1 determines a communication link of the terminal 4—the base station 3 is changed from the available state to the unavailable state, and the terminal inquires the associated transmission path set and finds that it is matched with the transmission path 4, and the terminal 1 deletes the transmission path 4. The transmission path set updated by the terminal 1 merely includes the transmission path 1, the transmission path 2 and the transmission path 3.

When the link change identifier indicates that the communication link is changed from the unavailable state to the available state, the terminal acquires the topological connection relation of each transmission path included in the associated transmission path set, determines a newly-added transmission path according to the link identity identifier and the topological connection relation, and adds the newly-added transmission path into the transmission path set associated with the terminal.

Continuing the above example, two nodes of a communication link corresponding to the terminal 1 according to the link identity identifier are the terminal 2 and the base station 2. The terminal 1 determines that the communication link between the terminal 2 and the base station 2 is changed from the unavailable state to the available state, and the terminal 1 determines a newly-added transmission path of the terminal 1 is the terminal 1—the terminal 2—the base station 2, according to a topological connection relation of four transmission paths in the associated transmission path set. The terminal 1 adds the newly-added transmission path into the associated transmission path set, then the updated associated transmission path set includes five transmission paths at the moment. The method for updating the transmission path set associated with the other terminals in the communication system can be referred to the above example, and it is not further repeated herein.

Optionally, the method further includes:

A target path is determined from an associated transmission path set when the terminal satisfies a preset path switching condition;

The terminal is switched to the target path for performing a service transmission.

Specifically, when the terminal satisfies the preset path switching condition, a target transmission path is determined from the associated transmission path set, and the terminal determines an export terminal and an export base station corresponding to the target transmission path. The terminal sends a switching request message to the export terminal, and the switching request message includes feature information of the terminal. When receiving a switching confirmation message returned by the export terminal, the terminal finishes a path switching operation according to the switching confirmation message; or when receiving the switching indication message returned by a serving base station, the terminal finishes the path switching operation according to the switching indication message. The target path is one or more transmission paths.

It can be seen from the above embodiment, when the terminal detects that the link state of the communication link between the adjacent network nodes changes, the terminal indicates the associated other terminals to update the link identity identifier of the communication link and the link change identifier, for updating the corresponding transmission path set, thus the transmission path set of each terminal in a terminal network is kept in the latest state, the terminal can perform a transmission path switching and a data transmission according to the latest transmission path set, and the reliability of service transmission is provided.

Figure 2A:
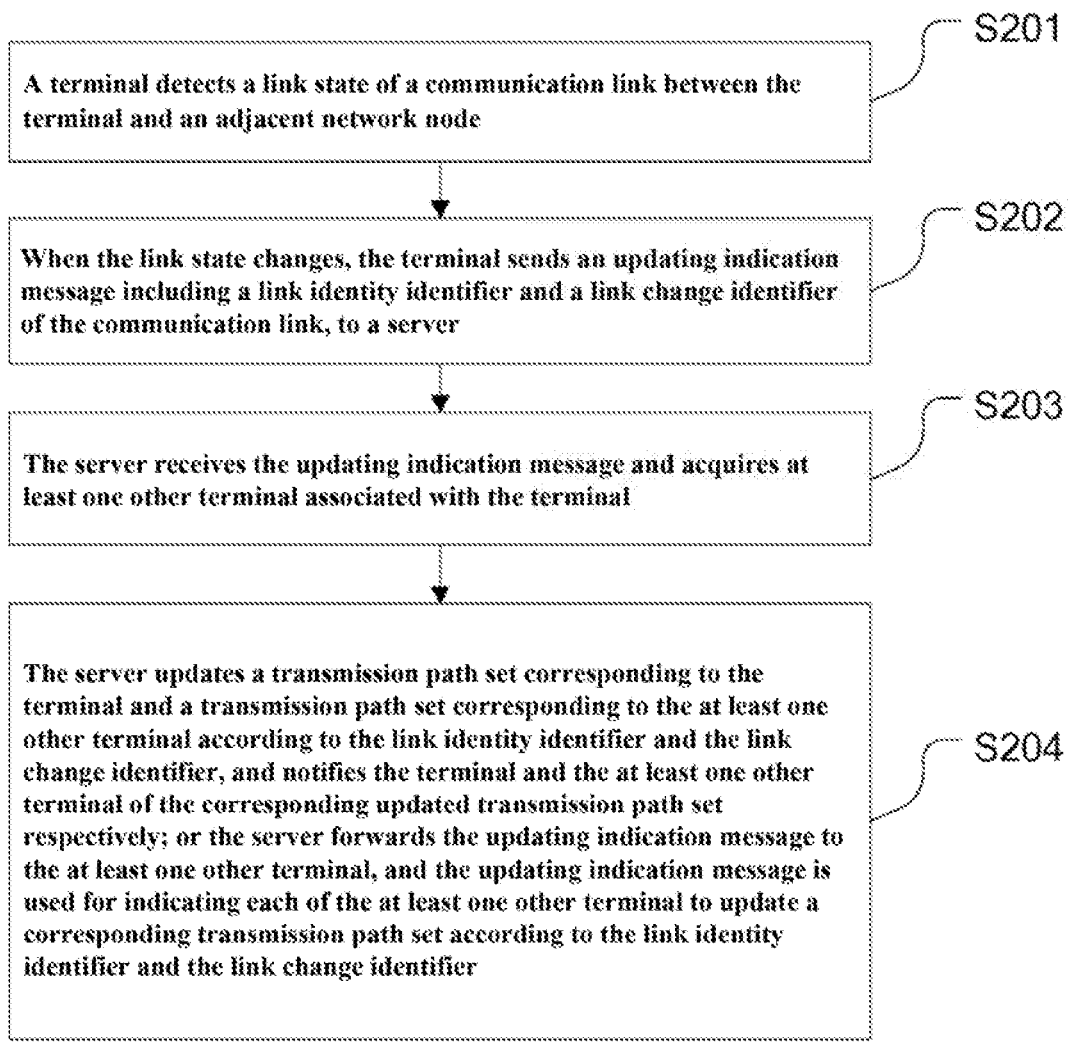
FIG. 2a is another flow diagram of a method for updating transmission paths provided by an embodiment of the present disclosure.

Referring to FIG. 2a, which is a flow diagram of a method for updating transmission paths provided by an embodiment of the present disclosure, in the embodiment of the present disclosure, the method includes:

S201, the terminal detects a link state of a communication link between the terminal and an adjacent network node.

Specifically, the adjacent network node represents a network node, a hop count between the adjacent network node and the terminal is 1, the terminal can be provided with one or more adjacent network nodes, a type of network nodes can be a terminal or a base station, and the communication link represents a channel for transmitting data between two network nodes. For example, two nodes of the communication link are the terminal 2 and the base station 3, thus, an link identity identifier of the communication link between the terminal 2 and the base station 3 can be represented by using identifiers of the terminal 2 and the base station 3. The link state of the communication link includes an available state and an unavailable state, the available state represents that link quality parameters of the communication link meet transmission requirements, and the unavailable state represents that the link quality parameters of the communication link do not meet the transmission requirements. When the link state of the communication link is the unavailable state, it is represented that the terminal is in a disconnected state in an extreme situation. In a general situation, the terminal is still in a connected state when the link state of the communication link is the unavailable state. The terminal determines all adjacent network nodes, the terminal can periodically detect link states of the communication links between the terminal and the adjacent network nodes, the method for determining the adjacent network nodes by the terminal can be that: the terminal acquires a pre-stored transmission path set associated with the terminal, and determines the adjacent network nodes according to a topological connection relation of each transmission path in the transmission path set. The transmission path set represents a set of all available transmission paths of a certain terminal, the transmission path includes at least one communication link.

S202, when the link state changes, the terminal sends an updating indication message including a link identity identifier and a link change identifier of the communication link to the server.

Specifically, the link identity identifier is used for uniquely representing the identity of the communication link, the link identity identifier of the communication link can be represented by using node identifiers of two network nodes corresponding to the communication link. The link change identifier represents a change tendency of the link state of the communication link, it indicates whether the link state is changed from the available state to the unavailable state or from the unavailable state to the available state. When the link state changes, the terminal sends the updating indication message including the link identity identifier and the link change identifier of the communication link to the server.

S203, the server receives the updating indication message, and acquires at least one other terminal associated with the terminal.

Specifically, the server receives the updating indication message, and acquires the at least one other terminal associated with the terminal according to a preset association relationship.

Specifically, the server determines the at least one other terminal that is associated with the terminal, according to a topological connection relation of each transmission path in a transmission path set associated with the terminal.

S204, the server updates a transmission path set corresponding to the terminal and a transmission path set corresponding to the at least one other terminal according to the link identity identifier and the link change identifier, and notifies the terminal of the corresponding updated transmission path set and notifies the at least one other terminal of the corresponding updated transmission path set; or the server forwards the updating indication message to the at least one other terminal, the updating indication message is used for indicating each other terminal in the at least one other terminal to update a corresponding transmission path set according to the link identity identifier and the link change identifier.

Specifically, the server updates the transmission path set corresponding to the terminal and the transmission path set corresponding to the at least one other terminal according to the link identity identifier and the link change identifier included in the received updating indication message, and respectively sends the corresponding updated transmission path sets to the terminal and the at least one other terminal. For the terminal and any terminal of the at least one other terminal, the method for sending the transmission path sets by the server can be as follows: the server acquires a current transmission path set that is associated with a certain terminal, and when the link change identifier is determined to indicate that the link state of the communication link is changed from the available state to the unavailable state, inquires for a transmission path that the communication link identifier is located, from the current transmission path set, and deletes the inquired transmission path; or when the link change identifier is determined to be changed from the unavailable state to the available state, acquires a newly-added transmission path according to a topological connection relation of each transmission path in the current transmission path set, and adds the newly-added transmission path into the current transmission path set.

In another possible implementation method in an embodiment of the present disclosure, after receiving the updating indication message sent by the terminal, the server works as a relay role, and the server broadcasts the updating indication message to the at least one other terminal, so as to reduce signaling transmission resources of the terminal. The server can be a network element (NE) independently located in a core network or located in other network nodes of the core network, or a NE independently located in an access network or located in other network nodes of the access network. The server broadcasts the updating indication message including the link identity identifier and the link change identifier of the communication link to the at least one other terminal, each one of the at least one other terminal updates the corresponding transmission path set according to the link identity identifier. For any other terminal among the at least one other terminal, the method for updating corresponding transmission path set can be as follows: one other terminal acquires a current transmission path set; when the link change identifier is determined to be changed from the available state to the unavailable state, inquires for a transmission path that the communication link identifier is located, from the current transmission path set, and deletes the inquired transmission path; or when the link change identifier is determined to be changed from the unavailable state to the available state, acquires a newly-added transmission path according to a topological connection relation of each transmission path in the current transmission path set, and adds the newly-added transmission path into the current transmission path set. A type of the terminal and the at least one other terminal is a D2D terminal or a TSC terminal.

Moreover and optionally, the server updates the transmission path set corresponding to the terminal and the transmission path set corresponding to the at least one other terminal according to the link identity identifier and the link change identifier, includes:

The server parses the link identity identifier and the link change identifier included in the updating indication message;

When the link change identifier indicates that it is changed from the available state to the unavailable state, the server inquires for a transmission path matched with the link identity identifier in the transmission path set associated with a target terminal, and deletes the matched transmission path from the transmission path set associated with the target terminal, the target terminal is the terminal or any terminal of the at least one other terminal;

When the link change identifier indicates that it is changed from the unavailable state to the available state, the server acquires a topological connection relation of each transmission path included in the transmission path set associated with the target terminal, determines a newly-added transmission path according to the link identity identifier and the topological connection relation, and adds the newly-added transmission path into the transmission path set associated with the target terminal.

Specifically, it is indicated that a link quality parameter of the communication link does not meet a requirement when the communication link is in the unavailable state, for example, the terminal periodically collects link quality parameter of the communication link. When the link quality parameter of the communication link is greater than a preset value, the communication link is determined to be in the available state, and when the link quality parameter of the communication link is smaller than the preset value, the communication link is determined to be in the unavailable state. Or, the terminal periodically collects a plurality of link quality parameters, and when the plurality of link quality parameters are all greater than a first preset value, the communication link is determined to be in the available state, and when the plurality of link quality parameters are all smaller than a second preset value, the communication link is determined to be in the unavailable state. When the plurality of link quality parameters are distributed between the first preset value and the second preset value, or include the first preset value or the second preset value, a rate of change of the plurality of link quality parameters is further determined. When the rate of change is a positive value, the communication link is determined to be in the available state, and when the rate of change is a negative value, the communication link is determined to be in the unavailable state. The target terminal is the terminal or any one of the at least one other terminal, the server parses the link identity identifier and the link change identifier included in the updating indication message. Under the condition that the link change identifier indicates that the communication link is changed from the available state to the unavailable state, the server inquires for the transmission path matched with the link identity identifier in the transmission path set associated with the target terminal, and deletes the matched transmission path from the associated transmission path set.

Figure 2B:
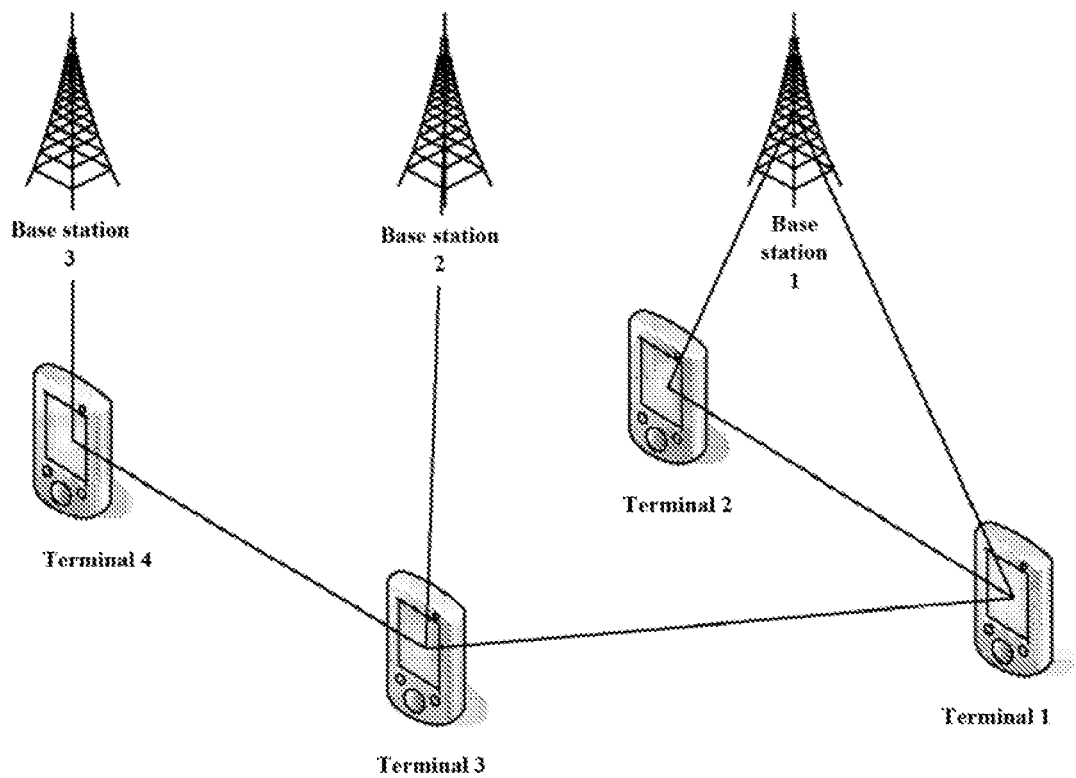

For example, referring to FIG. 2b, a communication system includes four terminals and three base stations, the terminal is assumed to be a terminal 1, and the other terminals associated with the terminal 1 are a terminal 2, a terminal 3 and a terminal 4, and two network nodes of the communication link corresponding to the link identity identifier of the terminal 1 are a terminal 4 and a base station, a transmission path set associated with the terminal 1 includes four transmission paths, which are a transmission path 1: the terminal 1—a base station 1, a transmission path 2: the terminal 1—the terminal 2—the base station 1, a transmission path 3: the terminal 1—the terminal 3—a base station 2, and a transmission path 4: the terminal 1—the terminal 3—the terminal 4—a base station 3. The terminal 1 determines a communication link of the terminal 4—the base station 3 is changed from the available state to the unavailable state, sends an updating indication message including a link identity identifier and a link change identifier to the server, and the server receives the updating indication message. The target terminal is assumed to be the terminal 1, the server inquires the transmission path set associated with the terminal 1 and finds that the transmission path 4 is matched. The server deletes the transmission path 4, and the transmission path set of the terminal 1 updated by the server merely includes the transmission path 1, the transmission path 2 and the transmission path 3.

When the link change identifier indicates that the communication link is changed from the unavailable state to the available state, the server acquires the topological connection relation of each transmission path included in the transmission path set associated with the target terminal, determines a newly-added transmission path according to the link identity identifier and the topological connection relation, and adds the newly-added transmission path into the transmission path set associated with the target terminal.

Continuing the above example, two nodes of a communication link corresponding to the server according to the link identity identifier are the terminal 2 and the base station 2. The server determines that the communication link between the terminal 2 and the base station 2 is changed from the unavailable state to the available state, and the server determines a newly-added transmission path of the terminal 1 is the terminal 1—the terminal 2—the base station 2, according to a topological connection relation of four transmission paths in the transmission path set associated with the terminal 1. The server adds the newly-added transmission path into the transmission path set associated with the terminal 1, then the updated transmission path set includes five transmission paths at the moment. The method for updating the transmission path set associated with the other terminals in the communication system can be referred to the above example, and it is not further repeated herein.

In one possible implementation method of the present disclosure, the method for updating the transmission path includes:

When the terminal triggers a service transmission, the terminal sends a transmission path request message to the server, and the transmission path request message is used for requesting the server to select at least one transmission path from the transmission path set associated with the terminal, and to notify the terminal of the at least one transmission path;

The terminal performs the service transmission according to the at least one transmission path notified by the server.

Specifically, when the terminal triggers the service transmission, the terminal sends the transmission path request message to the server actively. According to the method for updating the transmission path as mentioned above, the server stores the latest transmission path set of each terminal. When receiving the transmission path request message from the terminal, the server selects at least one transmission path from the latest transmission path set associated with the terminal, and the terminal triggers a transmission path switching process, and switches a current transmission path to the selected at least one transmission path for the service transmission.

Optionally, the method further includes:

A target path is determined from an associated transmission path set when the terminal satisfies a preset path switching condition;

The terminal is switched to the target path for performing a service transmission Specifically, when the terminal satisfies the preset path switching condition, a target transmission path is determined from the associated transmission path set, and the terminal determines an export terminal and an export base station corresponding to the target transmission path. The terminal sends a switching request message to the export terminal, and the switching request message includes feature information of the terminal. When receiving a switching confirmation message returned by the export terminal, the terminal finishes a path switching operation according to the switching confirmation message; or when receiving the switching indication message returned by a serving base station, the terminal finishes the path switching operation according to the switching indication message. The target path is one or more transmission paths.

It can be seen from the above embodiment, when the terminal detects that the communication link between the adjacent network nodes changes, the terminal sends the updating indication message to the server, to indicate the server to update the transmission path sets of the terminal and the associated at least one other terminal in a terminal network. The server notifies each terminal in the terminal network of the updated transmission path set; or the server works as a relay role, and indicates each terminal in the terminal network to update the corresponding transmission path set locally, so as to reduce transmission data of terminal signaling, and reduce processing cost.

Figure 3:
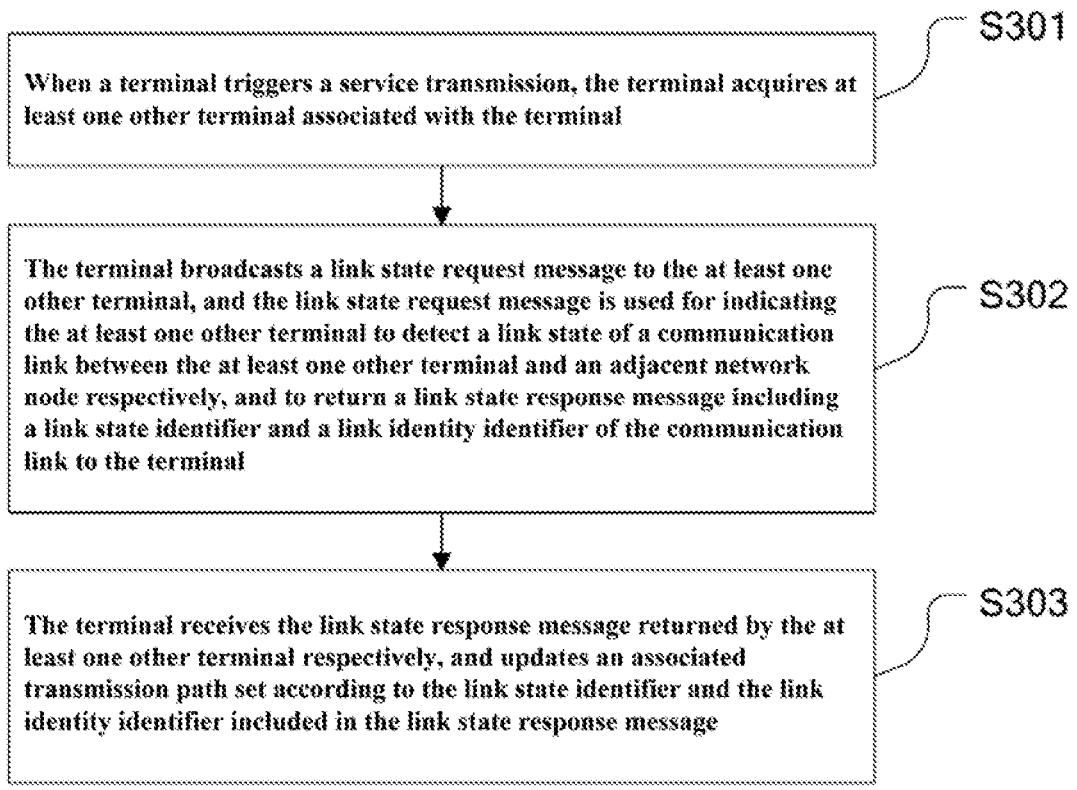
FIG. 3 is another flow diagram of a method for updating transmission paths provided by an embodiment of the present disclosure.

Referring to FIG. 3, which is another flow diagram of a method for updating transmission paths provided by an embodiment of the present disclosure, in the embodiment of the present disclosure, the method includes:

S301, when a terminal triggers a service transmission, the terminal acquires at least one other terminal associated;

Specifically, the service transmission includes an uplink transmission and a downlink transmission, and when the terminal detects that it is needed to perform the service transmission, the terminal acquires the at least one other terminal associated according to a preset binding relation.

S302, the terminal broadcasts a link state request message to the at least one other terminal, the link state request message is used for indicating the at least one other terminal to detect a link state of a communication link between each of the at least one other terminal and the adjacent network node, and to return a link state response message including the link state identifier and the link identity identifier of the communication link, to the terminal.

Specifically, the adjacent network node represent a network node, a hop count between the adjacent network node and the terminal is 1, the terminal can be provided with one or more adjacent network nodes, a type of network nodes can be a terminal or a base station, and the communication link represents a channel for transmitting data between two network nodes. The link state of the communication link includes an available state and an unavailable state, the available state represents that link quality parameters of the communication link meet transmission requirements, and the unavailable state represents that the link quality parameters of the communication link do not meet the transmission requirements. For example, the terminal periodically collects link quality parameter of the communication link. When the link quality parameter of the communication link is greater than a preset value, the communication link is determined to be in the available state, and when the link quality parameter of the communication link is smaller than the preset value, the communication link is determined to be in the unavailable state. Or, the terminal periodically collects a plurality of link quality parameters, and when the plurality of link quality parameters are all greater than a first preset value, the communication link is determined to be in the available state; and when the plurality of link quality parameters are all smaller than a second preset value, the communication link is determined to be in the unavailable state. When the plurality of link quality parameters are located between the first preset value and the second preset value, or the plurality of link quality parameters include the first preset value or the second preset value, a rate of change of the plurality of link quality parameters is further determined. When the rate of change is a positive value, the communication link is determined to be in the available state, and when the rate of change is a negative value, the communication link is determined to be in the unavailable state.

For any terminal of the at least one other terminal, the terminal determines all adjacent network nodes, the terminal can periodically detect link states of the communication links between the terminal and the adjacent network nodes, the method for determining the adjacent network nodes by the terminal can be that: the terminal acquires a pre-stored transmission path set, and determines the adjacent network nodes according to a topological connection relation of each transmission path in the transmission path set. The transmission path set represents a set of all available transmission paths of a certain terminal, the transmission path includes at least one communication link.

S303, the terminal receives a link state response message returned by each of the at least one other terminal, and updates an associated transmission path set according to the link state identifier and the link identity identifier included in the link state response message.

Specifically, the link identity identifier is used for uniquely representing the identity identifier of the communication link, and the identity identifier of the communication link can be represented by node identifiers of two network nodes corresponding to the communication link; the link state identifier represents whether a link of the communication link is in the available state or the unavailable state. The terminal receives the link state response message including the link identity identifier and the link state identifier of the communication link, returned by the at least one other terminal associated, the terminal updates the corresponding transmission path set according to the link state identifier and the link identity identifier. The method for updating the corresponding transmission path set can be that: one other terminal acquires a current transmission path set; and when the link state identifier is determined to represent the unavailable state, inquires a transmission path where the communication link identifier is located from the current transmission path set, deletes the inquired transmission path; or when the link state identifier is determined to represent the available state, acquires a newly-added transmission path according to the topological connection relation of each transmission path in the current transmission path set, and adds the newly-added transmission path into the current transmission path set.

It should be noted that, when the terminal broadcasts a link state request message to at least one other terminal, if a communication link between the terminal and a certain terminal in the at least one other terminal is unavailable, the terminal can indicate the other terminal among the at least one other terminal, to forward the link state request message to the certain terminal, the other terminal has an available communication link with the certain terminal. A type of the terminal and the at least one other terminal is a D2D terminal or a TSC terminal.

Optionally, the method further includes:

A target path is determined from an associated transmission path set when the terminal satisfies a preset path switching condition;

The terminal is switched to the target path for performing a service transmission.

Specifically, when the terminal satisfies the preset path switching condition, a target transmission path is determined from the associated transmission path set, and the terminal determines an export terminal and an export base station corresponding to the target transmission path. The terminal sends a switching request message to the export terminal, and the switching request message includes feature information of the terminal. When receiving a switching confirmation message returned by the export terminal, the terminal finishes a path switching operation according to the switching confirmation message; or when receiving the switching indication message returned by a serving base station, the terminal finishes the path switching operation according to the switching indication message. The target path is one or more transmission paths.

It can be seen from the above embodiment, when a transmission requirement is detected by the terminal, the terminal requests the at least one other terminal associated for a link state of each of at least one other terminal with corresponding adjacent network node, and updates the corresponding transmission path set locally according to the acquired link states, thus, a large number of messages generated by the change of the link state of the communication link in the terminal network can be avoided.

Figure 4A:
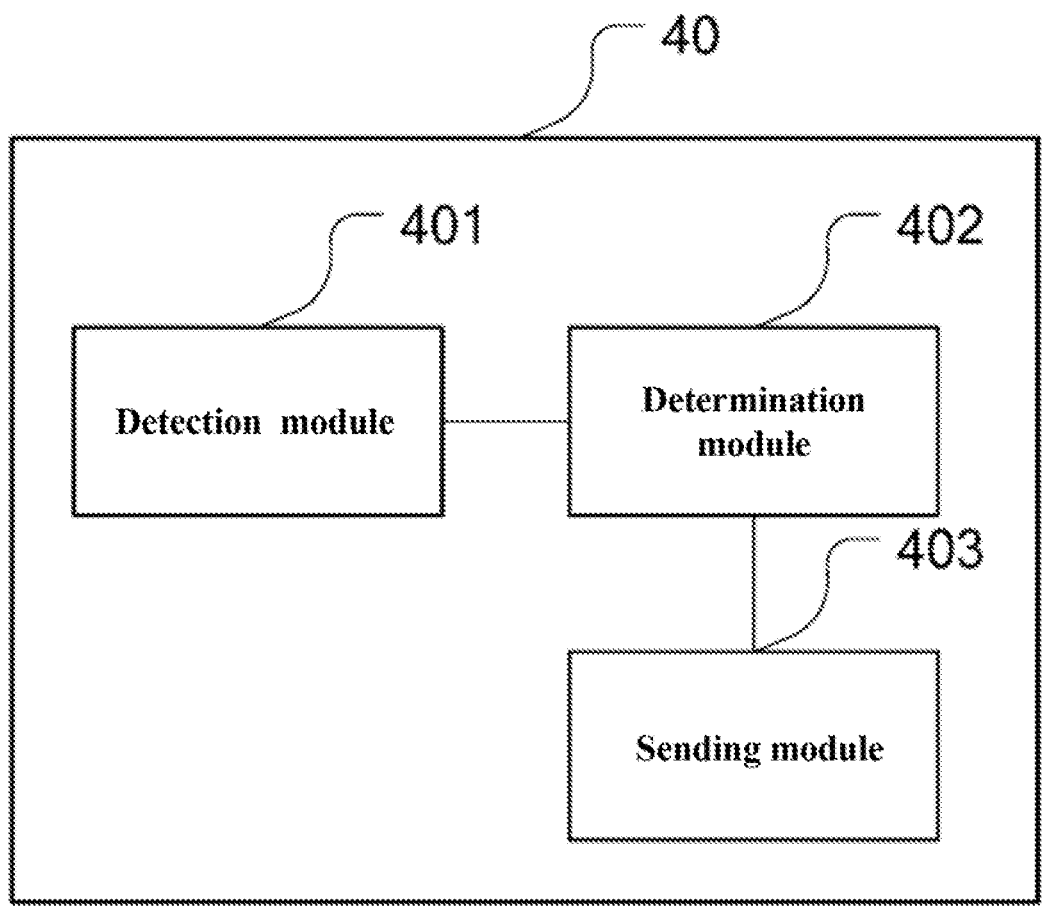
FIG. 4a is a schematic structural diagram of a terminal provided by a first embodiment of the present disclosure.

Referring to FIG. 4A, which is a schematic structural diagram of a terminal provided by a first embodiment of the present disclosure. The terminal of the embodiment of the present disclosure is used for performing the method for updating transmission paths in FIG. 1a, terms and processes involved can be referred to the descriptions in the embodiments of FIG. 1a. A terminal 40 includes a detection module 401, a determination module 402 and a sending module 403.

The detection module 401 is configured to detect a link state of a communication link between the terminal (e.g., the terminal 40 as shown in FIG. 4a) and an adjacent network node.

The determination module 402 is configured to determine at least one other terminal associated with the terminal 40, when the link state changes.

The sending module 403 is configured to send a first updating indication message including a link identity identifier and a link change identifier of the communication link, to the at least one other terminal, and the first updating indication message is used for indicating each of the at least one other terminal to update a corresponding transmission path set according to the link identity identifier and the link change identifier.

Optionally, the determination module 403 includes:

An acquisition unit is configured to acquire a transmission path set associated with the terminal;

A determination unit is configured to determine the at least one other terminal according to a topological connection relation of the transmission path set associated with the terminal.

Optionally, the terminal 40 further includes a receiving module and an updating module.

The receiving module is configured to receive a second updating indication message including a link identity identifier and a link change identifier sent by any one of the at least one other terminal.

The updating module is configured to update the associated transmission path set according to the link identity identifier and the link change identifier included in the second updating indication message.

Optionally, the updating module is specifically configured to:

Parse the link identity identifier and the link change identifier included in the second updating indication message;

Inquire for a transmission path matched with the link identity identifier in the transmission path set associated with the terminal when the link change identifier indicates that it is changed from an available state to an unavailable state, and delete the matched transmission path from the transmission path set associated with the terminal;

Acquire a topological connection relation of each transmission path included in the transmission path set associated with the terminal when the link change identifier indicates that it is changed from the unavailable state to the available state, determine a newly-added transmission path according to the link identity identifier and the topological connection relation, and add the newly-added transmission path into the transmission path set associated with the terminal.

Optionally, the terminal 40 further includes:

A switching module, which is configured to determine a target path from the associated transmission path set when a preset path switching condition is satisfied, and switch to the target path for performing a service transmission.

The embodiment of the present disclosure and the method embodiment of FIG. 1a are based on a same concept, and have same technical effects, thus, the detailed process can be referred to the descriptions of a first embodiment in FIG. 1a, it is not repeated herein.

Figure 4B:
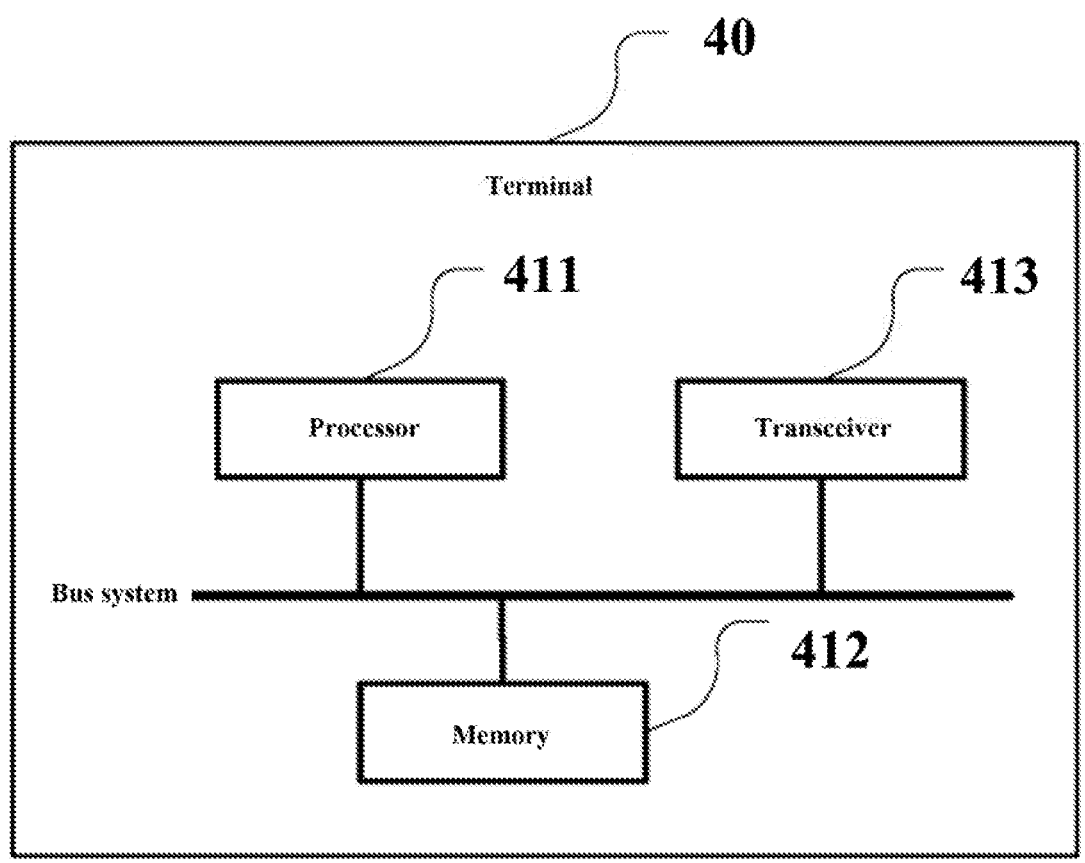
FIG. 4b is a schematic structural diagram of a terminal provided by a second embodiment of the present disclosure.

Referred to FIG. 4b, which is another schematic structural diagram of a terminal according to an embodiment of the present disclosure, in the embodiment of the present disclosure, a terminal 40 includes a processor 411, a memory 412 and a transceiver 413. The terminal 40 can be different types of electronic devices, such as a smart phone, a tablet computer, a handheld computer, a mobile Internet equipment, a personal digital assistant, a media player, a smart television, a smart watch, smart glasses, a smart bracelet, and the like. The transceiver 413 is configured to transmit and receive data between the transceiver 413 and an external device. A number of the processor 411 in the terminal 40 can be one or more. The processor 411 can be a central processing unit (CPU), and the memory 412 can be a high-speed random access memory (RAM), or a non-volatile memory, such as at least one magnetic disk storage. In some embodiments of the present disclosure, the processor 411, the memory 412 and the transceiver 413 can be connected through a bus system or other modes. The terminal 40 can be used to perform the method shown in FIG. 1a. Meaning and examples of the terms involved in the embodiments can refer to the embodiments corresponding to FIG. 1a. It is not repeated herein.

The memory 412 stores program codes. The processor 411 is used for invoking the program codes stored in the memory 412 to execute the following operations:

Detecting a link state of a communication link between the terminal and an adjacent network node;

When the link state changes, determining at least one other terminal associated with the terminal;

Sending a first updating indication message including a link identity identifier and a link change identifier of the communication link, to the at least one other terminal, and the first updating indication message is used for indicating each of the at least one other terminal to update a corresponding transmission path set according to the link identity identifier and the link change identifier.

In some embodiments of the present disclosure, the processor 411 executes the determination of at least one other terminal associated with the terminal (e.g., the terminal 40), including:

Acquiring a transmission path set associated with the terminal;

Determining the at least one other terminal according to a topological connection relation of the transmission path set associated with the terminal.

In some embodiments of the present disclosure, the processor 411 is further configured to execute:

Receiving a second updating indication message including a link identity identifier and a link change identifier sent by any one of the at least one other terminal;

Updating the associated transmission path set according to the link identity identifier and the link change identifier included in the second updating indication message.

In some embodiments of the present disclosure, the processor 411 executes the updating of the associated transmission path set according to the link identity identifier and the link change identifier included in the second updating indication message, including:

Parsing the link identity identifier and the link change identifier included in the second updating indication message;

When the link change identifier indicates that it is changed from an available state to an unavailable state, inquiring for a transmission path matched with the link identity identifier in the transmission path set associated with the terminal, and deleting the matched transmission path from the transmission path set associated with the terminal;

When the link change identifier indicates that it is changed from the unavailable state to the available state, acquiring a topological connection relation of each transmission path included in the transmission path set associated with the terminal, determining a newly-added transmission path according to the link identity identifier and the topological connection relation, and adding the newly-added transmission path into the transmission path set associated with the terminal.

Figure 5A:
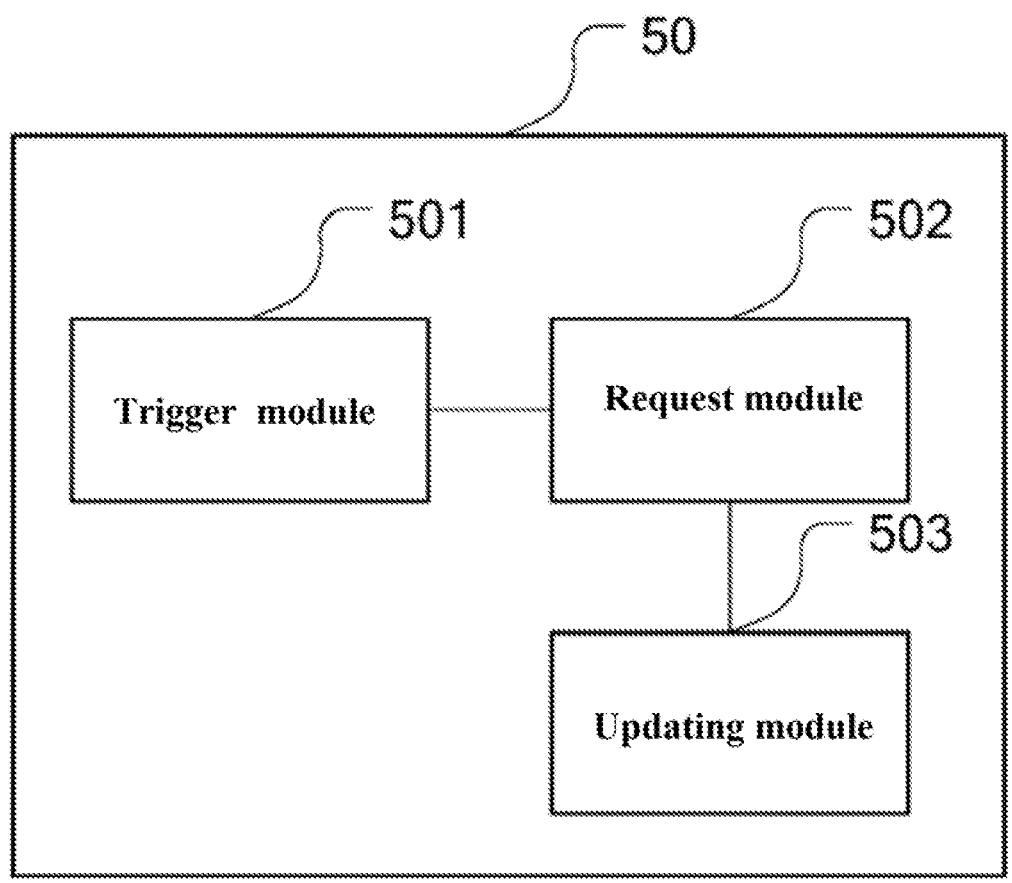
FIG. 5a is a schematic structural diagram of a terminal provided by a third embodiment of the present disclosure.

Referred to FIG. 5a, which is a schematic structural diagram of a terminal according to an embodiment of the present disclosure, the terminal of the embodiment of the present disclosure is used for performing the method for updating transmission paths in FIG. 3a, terms and process involved can be referred to the descriptions in the embodiments of FIG. 3a. A terminal 50 includes a trigger module 501, a request module 502 and an updating module 503.

The triggering module 501 is configured to acquire at least one other terminal associated, when a service transmission is triggered.

The request module 502 is configured to broadcast a link state request message to the at least one other terminal, the link state request message is used for indicating the at least one other terminal to detect a link state of a communication link between each of the at least one other terminal and an adjacent network node, and to return a link state response message including the link state identifier and the link identity identifier of the communication link, to the terminal.

The updating module 503 is configured to receive a link state response message returned by each of the at least one other terminal, and update an associated transmission path set according to the link state identifier and the link identity identifier included in the link state response message.

Optionally, the terminal 40 further includes:

A switching module is configured to determine a target path from the associated transmission path set when a preset path switching condition is satisfied, and switch to the target path for performing a service transmission.

The embodiment of the present disclosure and the method embodiment of FIG. 3a are based on a same concept, and have same technical effects, thus, the detailed process can be referred to the descriptions of a first embodiment in FIG. 3a, it is not repeated herein.

Figure 5B:
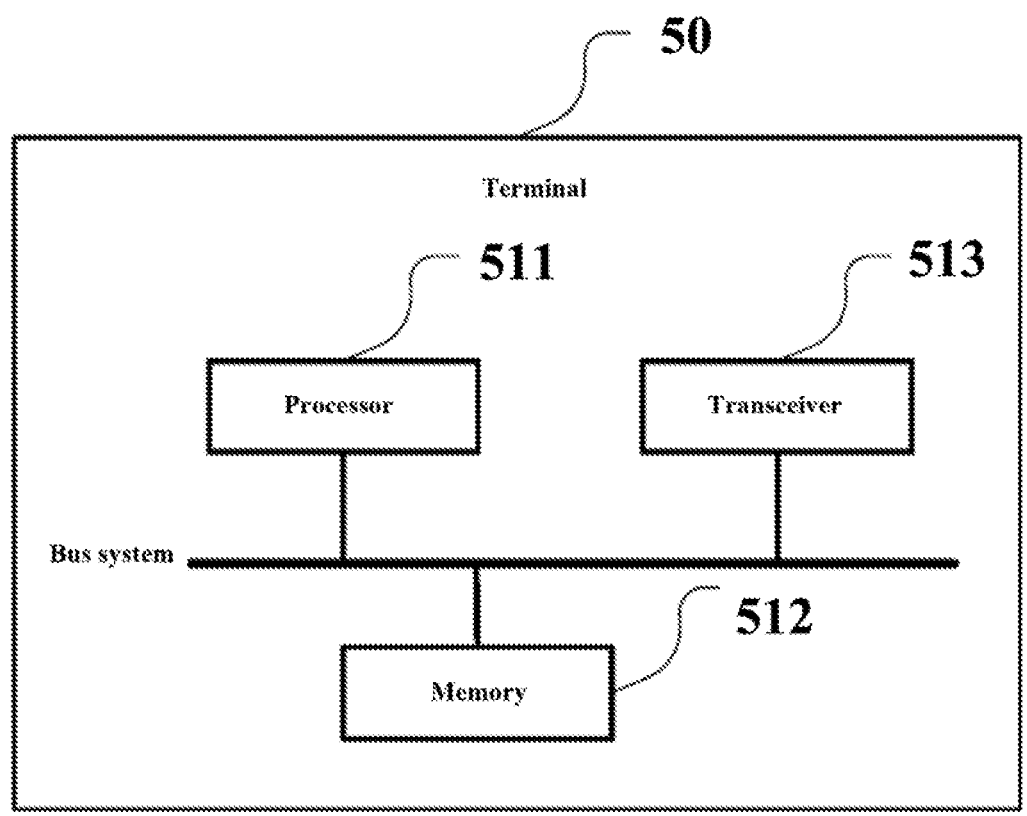
FIG. 5b is a schematic structural diagram of a terminal provided by a fourth embodiment of the present disclosure.

Referred to FIG. 5b, which is another schematic structural diagram of a terminal according to an embodiment of the present disclosure, in the embodiment of the present disclosure, a terminal 50 includes a processor 511, a memory 512 and a transceiver 513, and the transceiver 513 is configured to transmit and receive data between the transceiver 513 and an external device. A number of the processor 511 in the terminal 50 can be one or more. In some embodiments of the present disclosure, the processor 511, the memory 512 and the transceiver 513 can be connected through a bus system or other modes. The terminal 50 can be used to perform the method shown in FIG. 3A. The terminal 50 in the embodiment of the present disclosure can be different types of electronic devices, such as a smart phone, a tablet computer, a handheld computer, a mobile Internet equipment, a personal digital assistant, a media player, a smart television, a smart watch, smart glasses, a smart bracelet, and the like. The processor 511 can be a central processing unit (CPU), and the memory 512 can be a high-speed random access memory (RAM), or a non-volatile memory, such as at least one magnetic disk storage. Meaning and examples of the terms involved in the embodiments can refer to the embodiments corresponding to FIG. 3a. It is not repeated herein.

The memory 512 stores program codes. The processor 511 is used for invoking the program codes stored in the memory 512 to execute the following operations:

Acquiring at least one other terminal associated, when the terminal triggers a service transmission;

Broadcasting a link state request message to the at least one other terminal by the terminal, the link state request message being used for indicating the at least one other terminal to detect a link state of a communication link between each of the at least one other terminal and an adjacent network node, and to return a link state response message including the link state identifier and the link identity identifier of the communication link, to the terminal;

Receiving a link state response message returned by each of the at least one other terminal, and updating an associated transmission path set according to the link state identifier and the link identity identifier included in the link state response message by the terminal.

In some embodiments of the present disclosure, a type of the network node is a base station or a terminal, the terminal and the at least one other terminal can be D2D terminals or TSC terminals.

Figure 6:
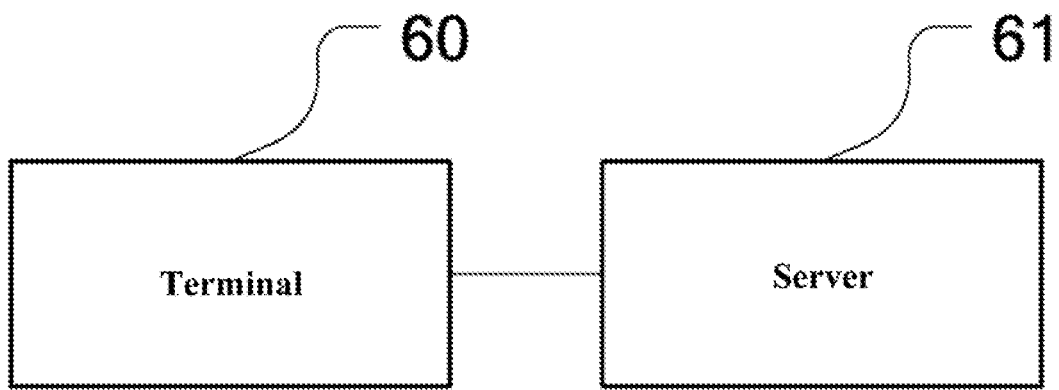
FIG. 6 is a schematic structural diagram of a communication system provided by an embodiment of the present disclosure.

Referring to FIG. 6, which is a schematic structural diagram of a communication system according to an embodiment of the present disclosure, the terminal of the embodiment of the present disclosure is used to perform the method for updating transmission paths in FIG. 2a, terms and processes involved can refer to the embodiments in FIG. 2a. The communication system includes a terminal 60 and a server 61.

The terminal 60 is configured for detecting a link state of a communication link between the terminal 60 and an adjacent network node; when the link state changes, sending an updating indication message including a link identity identifier and a link change identifier of the communication link, to the server 61;

The server 61 is configured for receiving the updating indication message and acquiring at least one other terminal associated with the terminal 60; and updating transmission path sets corresponding to the terminal 60 and the at least one other terminal respectively according to the link identity identifier and the link change identifier; and respectively notifying the terminal 60 and the at least one other terminal of the corresponding updated transmission path sets; or forwarding the updating indication message to the at least one other terminal, the updating indication message is used for indicating that each of the at least one other terminal to update a corresponding transmission path set according to the link identity identifier and the link change identifier.

Optionally, the server 61 is specifically configured to:

Parse the link identity identifier and the link change identifier included in the updating indication message;

Inquire for a transmission path matched with the link identity identifier in the transmission path set associated with a target terminal when the link change identifier indicates that it is changed from an available state to an unavailable state, and delete the matched transmission path from the transmission path set associated with the target terminal; the target terminal being any one of the terminal 60 and the at least one other terminal;

Acquire a topological connection relation of each transmission path included in the transmission path set associated with the target terminal when the link change identifier indicates that it is changed from the unavailable state to the available state, determine a newly-added transmission path according to the link identity identifier and the topological connection relation, and add the newly-added transmission path into the transmission path set associated with the target terminal.

Optionally, the terminal 60 further includes:

A switching module, which is configured to determine a target path from the associated transmission path set when a preset path switching condition is satisfied, and switch to the target path for performing a service transmission.

The embodiment of the present disclosure and the method embodiment of FIG. 2a are based on a same concept, and have same technical effects, thus, the detailed process can be referred to the descriptions of a first embodiment in FIG. 2a, it is not repeated herein.

The terminal provided by the embodiments of the present disclosure includes, but is not limited to, a terminal installed the iOS® operating system (OS), the Android® OS, the Microsoft® OS, or other OS, such as mobile phones. The terminal also may be other terminals, such as having a touch-sensitive surface (e.g., a touch screen display and/or a touch panel) or a tablet computer or a desktop computer.

In one possible implementation method of the present disclosure, the terminal includes:

A trigger module, which is configured to send a transmission path request message to the server when a service transmission is triggered, and the transmission path request message is used for requesting the server to select at least one transmission path from a transmission path set associated with the terminal, and to notify the at least one transmission path to the terminal;

A switching module, which is configured to perform a service transmission according to the at least one transmission path notified.

In the following discussion, a terminal including a display and a touch-sensitive surface is described. However, it should be understood that, the terminal can include one or more other physical user interface devices, such as a physical keyboard, a mouse and/or a lever.

The terminal typically supports a plurality of applications, such as one or more of the following: drawing application programs, presenting application programs, word processing application programs, webpage creating application programs, disc editing application programs, electronic table application programs, game application programs, telephone application programs, video conference application programs, e-mail application programs, instant message application programs, exercising support application programs, photo management application programs, digital camera application programs, digital video camera application programs, network browsing application programs, digital music player application programs and/or digital video player application programs.

Various application programs executable on a terminal may use at least one shared physical user interface device, such as a touch-sensitive surface. One or more functions of the touch-sensitive surface and corresponding information displayed on the terminal may be adjusted and/or changed from one application program to a next application program, and/or be adjusted and/or changed within a corresponding application program. In this way, a common physical architecture (such as the touch-sensitive surface) of the terminal can utilize a user interface that is intuitive and clear to the user, to support various application programs.

Persons of ordinary skill in the art can understand that realization of all or part of the procedures in the methods of the above embodiments can be completed by indicating relevant hardware through a computer program, the program can be stored in a computer readable storage medium. When the program is executed, the program can include the flow of the embodiments of the above methods. The storage medium can be a magnetic disk, an optical disk, a read-only memory (ROM), or a random access memory (RAM) etc.

I claim:

1. A method for updating transmission paths, executed by a terminal, comprising:
    detecting a link state of a communication link between the terminal and an adjacent network node;
    determining at least one other terminal associated with the terminal when the link state changes;
    sending a first updating indication message comprising a link identity identifier and a link change identifier of the communication link, to the at least one other terminal, the first updating indication message being used for indicating each of the at least one other terminal to update a corresponding transmission path set according to the link identity identifier and the link change identifier;
    when the terminal satisfies a preset path switching condition, determining a target transmission path from an associated transmission path set of the terminal;
    determining an export terminal and an export base station corresponding to the target transmission path;
    sending a switching request message to the export terminal, wherein the switching request message comprises feature information of the terminal; and
    upon receiving a switching confirmation message returned by the export terminal, finishing a path switching operation according to the switching confirmation message; or
    upon receiving a switching indication message returned by a serving base station, finishing the path switching operation according to the switching indication message.

2. The method for updating transmission paths of claim 1, wherein a first method of determining at least one other terminal associated with the terminal comprises:
    acquiring the transmission path set associated with the terminal;
    determining the at least one other terminal according to a topological connection relation of the transmission path set associated with the terminal; and
    a second method of determining at least one other terminal associated with the terminal comprises:
    acquiring a topological connection relation of a self-organizing network from a server, wherein the self-organizing network is formed of a plurality of terminals, the server maintains the topological connection relation of the self-organizing network, and when a terminal is deleted from the self-organizing network or is newly-added, the server updates the topological connection relation of the self-organizing network in real time; and
    acquiring the at least one other terminal according to the topological connection relation of the self-organizing network.

3. The method for updating transmission paths of claim 2, further comprising:
    receiving a second updating indication message comprising a link identity identifier and a link change identifier sent by any one of the at least one other terminal;
    updating an associated transmission path set according to the link identity identifier and the link change identifier comprised in the second updating indication message.

4. The method for updating transmission paths of claim 3, wherein updating the associated transmission path set according to the link identity identifier and the link change identifier comprised in the second updating indication message comprises:
    parsing the link identity identifier and the link change identifier comprised in the second updating indication message;
    when the link change identifier indicates that it is changed from an available state to an unavailable state, inquiring for a transmission path matched with the link identity identifier in the transmission path set associated with the terminal, and deleting the matched transmission path from the transmission path set associated with the terminal; or
    when the link change identifier indicates that it is changed from the unavailable state to the available state, acquiring a topological connection relation of each transmission path comprised in the transmission path set associated with the terminal, determining a newly-added transmission path according to the link identity identifier and the topological connection relation, and adding the newly-added transmission path into the transmission path set associated with the terminal;
    wherein the terminal periodically collects a plurality of link quality parameters, and when the plurality of link quality parameters are all greater than a first preset value, the communication link is determined to be in the available state, when the plurality of link quality parameters are all smaller than a second preset value, the communication link is determined to be in the unavailable state, when the plurality of link quality parameters are distributed between the first preset value and the second preset value, or the plurality of link quality parameters comprise the first preset value or the second preset value, a rate of change of the plurality of link quality parameters is determined, when the rate of change is a positive value, the communication link is determined to be in the available state, and when the rate of change is a negative value, the communication link is determined to be in the unavailable state.

5. The method for updating transmission paths of claim 1, wherein the associated transmission path set of the terminal is updated by:
    acquiring at least one other terminal associated with the terminal when the terminal triggers a service transmission;
    broadcasting a link state request message to the at least one other terminal, the link state request message being used for indicating the at least one other terminal to detect a link state of a communication link between each of the at least one other terminal and an adjacent network node, and to return a link state response message comprising a link state identifier and a link identity identifier of the communication link to the terminal;
    receiving a link state response message returned by each of the at least one other terminal, and updating the associated transmission path set according to the link state identifier and the link identity identifier comprised in the link state response message.

6. The method for updating transmission paths of claim 1, further comprising:
when the terminal triggers a service transmission, sending a transmission path request message to a server, the transmission path request message being used for requesting the server to select at least one transmission path from a transmission path set associated with the terminal and to notify the terminal of the at least one transmission path;
performing the service transmission according to the notified transmission path.

7. The method for updating transmission paths of claim 1, wherein a type of the adjacent network node is a base station or a terminal, and the terminal and the at least one other terminal are Device-to-Device (D2D) terminals or a Terminal Services Client (TSC) terminals.

8. The method for updating transmission paths of claim 1, further comprising:
when a communication link between the terminal and one of the at least one other terminal is unavailable, indicating the other terminal among the at least one other terminal to forward the first updating indication message to the one of the at least one other terminal, the other terminal having an available communication link with the one of the at least one other terminal.

9. A terminal, comprising:
a processor; and
a memory storing a plurality of instructions, which when executed by the processor, causes the processor to:
detect a link state of a communication link between the terminal and an adjacent network node;
determine at least one other terminal associated with the terminal when the link state changes;
send a first updating indication message comprising a link identity identifier and a link change identifier of the communication link, to the at least one other terminal, the first updating indication message being used for indicating each of the at least one other terminal to update a corresponding transmission path set according to the link identity identifier and the link change identifier;
when the terminal satisfies a preset path switching condition, determine a target transmission path from an associated transmission path set of the terminal;
determine an export terminal and an export base station corresponding to the target transmission path;
send a switching request message to the export terminal, wherein the switching request message comprises feature information of the terminal;
upon receiving a switching confirmation message returned by the export terminal, finish a path switching operation according to the switching confirmation message; or
upon receiving a switching indication message returned by a serving base station, finish the path switching operation according to the switching indication message.

10. The terminal of claim 9, wherein the processor further:
acquires a topological connection relation of a self-organizing network from a server, wherein the self-organizing network is formed of a plurality of terminals, the server maintains the topological connection relation of the self-organizing network, and when a terminal is deleted from the self-organizing network or is newly-added, the server updates the topological connection relation of the self-organizing network in real time; and acquires the at least one other terminal according to the topological connection relation of the self-organizing network.

11. The terminal of claim 10, wherein the processor further:
receives a second updating indication message comprising a link identity identifier and a link change identifier sent by any one of the at least one other terminal;
updates the associated transmission path set according to the link identity identifier and the link change identifier comprised in the second updating indication message.

12. The terminal of claim 11, wherein the processor further:
parses the link identity identifier and the link change identifier comprised in the second updating indication message;
when the link change identifier indicates that it is changed from an available state to an unavailable state, inquires for a transmission path matched with the link identity identifier in the transmission path set associated with the terminal, and deletes the matched transmission path from the transmission path set associated with the terminal;
when the link change identifier indicates that it is changed from the unavailable state to the available state, acquires a topological connection relation of each transmission path comprised in the transmission path set associated with the terminal, determines a newly-added transmission path according to the link identity identifier and the topological connection relation, and adds the newly-added transmission path into the transmission path set associated with the terminal;
wherein the processor periodically collects a plurality of link quality parameters, and when the plurality of link quality parameters are all greater than a first preset value, the communication link is determined to be in the available state, when the plurality of link quality parameters are all smaller than a second preset value, the communication link is determined to be in the unavailable state, when the plurality of link quality parameters are distributed between the first preset value and the second preset value, or the plurality of link quality parameters comprise the first preset value or the second preset value, a rate of change of the plurality of link quality parameters is determined, when the rate of change is a positive value, the communication link is determined to be in the available state, and when the rate of change is a negative value, the communication link is determined to be in the unavailable state.

13. The terminal of claim 9, wherein the processor further:
acquires at least one other terminal associated with the terminal when a service transmission is triggered;
broadcasts a link state request message to the at least one other terminal, the link state request message being used for indicating the at least one other terminal to detect a link state of a communication link between each of the at least one other terminal and an adjacent network node, and to return a link state response message comprising a link state identifier and a link identity identifier of the communication link to the terminal;
receives a link state response message returned by each of the at least one other terminal, and updates an associated transmission path set according to the link state identifier and the link identity identifier comprised in the link state response message.

14. The terminal of claim 9, wherein the processor further:

sends a transmission path request message to a server when the terminal triggers a service transmission, the transmission path request message being used for requesting the server to select at least one transmission path from the transmission path set associated with the terminal and to notify the terminal of the at least one transmission path;

performs the service transmission according to the notified transmission path.

15. The terminal of claim 9, wherein:

when a communication link between the terminal and one of the at least one other terminal is unavailable, the processor further indicates the other terminal among the at least one other terminal to forward the first updating indication message to the one of the at least one other terminal, the other terminal having an available communication link with the one of the at least one other terminal.

* * * * *